United States Patent
Beauvillain

(10) Patent No.: US 11,144,067 B2
(45) Date of Patent: Oct. 12, 2021

(54) ELECTRONIC DEVICE AND METHOD FOR MONITORING A SET OF AUTONOMOUS MOTOR VEHICLES, ASSOCIATED TRANSPORT SYSTEM AND COMPUTER PROGRAM

(71) Applicant: TRANSDEV GROUP, Issy les Moulineaux (FR)

(72) Inventor: Alexis Beauvillain, Massy (FR)

(73) Assignee: TRANSDEV GROUP INNOVATION, Issy-les-Moulineaux (FR)

( * ) Notice: Subject to any disclaimer, the term of this patent is extended or adjusted under 35 U.S.C. 154(b) by 222 days.

(21) Appl. No.: 16/453,113

(22) Filed: Jun. 26, 2019

(65) Prior Publication Data

US 2019/0391596 A1    Dec. 26, 2019

(30) Foreign Application Priority Data

Jun. 26, 2018 (FR) .................................... 18 55699

(51) Int. Cl.
| | |
|---|---|
| *G05D 1/02* | (2020.01) |
| *B60W 30/16* | (2020.01) |
| *G05D 1/00* | (2006.01) |
| *G08G 1/0967* | (2006.01) |

(52) U.S. Cl.
CPC .......... *G05D 1/0287* (2013.01); *B60W 30/16* (2013.01); *G05D 1/0088* (2013.01); *G08G 1/0967* (2013.01); *G05D 1/0055* (2013.01)

(58) Field of Classification Search
CPC .. G05D 1/0287; G05D 1/0088; G05D 1/0055; G05D 1/0297; G05D 2201/0212; G05D 2201/0213; B60W 30/16; G08G 1/0967; G08G 1/096725; G08G 1/096775; G08G 1/04; G08G 1/0116; G08G 1/0133; G08G 1/0145; G08G 1/096741; G08G 1/0112
See application file for complete search history.

(56) References Cited

U.S. PATENT DOCUMENTS

| | | | |
|---|---|---|---|
| 2016/0284212 A1 | 9/2016 | Tatourian et al. | |
| 2017/0050638 A1 | 2/2017 | Gordon et al. | |
| 2017/0123421 A1* | 5/2017 | Kentley | ................ G08G 1/202 |
| 2017/0248964 A1* | 8/2017 | Kentley | ................ G08G 1/202 |
| 2018/0061230 A1 | 3/2018 | Madigan et al. | |
| 2018/0284770 A1* | 10/2018 | VandenBerg, III | .. G08G 1/0145 |
| 2018/0356837 A1* | 12/2018 | Lisewski | ............... H04L 9/3213 |
| 2019/0025820 A1* | 1/2019 | Ferguson | ............. G05D 1/0027 |
| 2019/0315354 A1* | 10/2019 | Kleemann | ............. B60W 60/00 |

OTHER PUBLICATIONS

French Search Report for French Application No. FR1855699, dated May 7, 2019 in 2 pages.

* cited by examiner

*Primary Examiner* — Michael J Zanelli
(74) *Attorney, Agent, or Firm* — Knobbe, Martens Olson & Bear, LLP

(57) ABSTRACT

An electronic device for monitoring a set of autonomous motor vehicles includes a detection module configured to detect an event associated with a plurality of vehicles from among the set of autonomous motor vehicles, a calculating module configured to calculate, as a function of the detected event, a setpoint for limiting the movement for each vehicle of said plurality of vehicles, and a transmission module configured to transmit the calculated setpoint(s) to the plurality of vehicles associated with the detected event.

13 Claims, 2 Drawing Sheets

ELECTRONIC DEVICE AND METHOD FOR MONITORING A SET OF AUTONOMOUS MOTOR VEHICLES, ASSOCIATED TRANSPORT SYSTEM AND COMPUTER PROGRAM

CROSS-REFERENCE TO RELATED APPLICATIONS

This application is a U.S. non-provisional application claiming the benefit of French Application No. 18 55699, filed on Jun. 26, 2018, which is incorporated herein by reference in its entirety.

FIELD

The present invention relates to an electronic device for monitoring a set of autonomous motor vehicles.

The invention also relates to a transport system comprising a set of autonomous motor vehicles and such an electronic monitoring device configured to monitor said set of autonomous motor vehicles.

The invention also relates to a method for monitoring a set of autonomous motor vehicles, the method being carried out by such an electronic monitoring device.

The invention also relates to a non-transitory computer-readable medium including a computer program including software instructions which, when executed by a computer, implement such a monitoring method.

The invention relates to the field of autonomous motor vehicles, in particular autonomous motor vehicles having a level of automation greater than or equal to 3 on the scale of the Organisation Internationale des Constructeurs Automobiles (OICA) [International Organization of Motor Vehicle Manufacturers].

BACKGROUND

Traditionally, an autonomous motor vehicle, in particular an autonomous motor vehicle having a level of automation equal to 3, 4 or 5 on the OICA scale, is equipped with a plurality of sensors and one or several computers coupled to these sensors, for example to allow the autonomous vehicle to position itself on the road and adjust its speed based on automobile traffic, in order to avoid a collision with another vehicle or an obstacle, to detect a change in trajectory or to perform a parking maneuver.

However, the safety of a transport system comprising a set of such autonomous motor vehicles can still be improved.

SUMMARY

The aim of the invention is then to propose an electronic device and an associated method for monitoring a set of autonomous motor vehicles making it possible to further improve the safety of passengers on board such motor vehicles.

To that end, the invention relates to an electronic device for monitoring a set of autonomous motor vehicles, the device comprising:
- a detection module configured to detect an event associated with a plurality of vehicles from among the set of autonomous motor vehicles;
- a calculating module configured to calculate, as a function of the detected event, a setpoint for limiting the movement for each vehicle of said plurality of vehicles;
- a transmission module configured to transmit the calculated setpoint(s) to the plurality of vehicles associated with the detected event.

Thus, with the electronic monitoring device according to the invention, the detection module makes it possible to detect an event capable of affecting the safety of the plurality of vehicles, then the calculating module makes it possible to calculate a setpoint limiting the movement for each vehicle of said plurality of vehicles, as a function of the detected event, and the transmission module transmits the calculated setpoints to said plurality of vehicles, so that each of the plurality of vehicles limits its movement in light of the received setpoint.

The electronic monitoring device according to the invention then makes it possible to improve the safety of the passengers on board such autonomous motor vehicles, by commanding a limitation of the movement of each vehicle for a plurality of vehicles at one time, from the detection of an event shared by this plurality.

This is still more advantageous when the event is not necessarily detectable using sensors on board each respective autonomous vehicle, or when the event is detectable only by some vehicles of said plurality of vehicles.

As an example, the electronic monitoring device according to the invention is then particularly advantageous when the detected event is a weather event, such as fog, ice, snow, rain, wind; an abnormal density of traffic elements; or an attack, such as a cyberattack or a terrorist attack, against the autonomous motor vehicles.

According to other advantageous aspects of the invention, the electronic monitoring device comprises one or more of the following features, considered alone or according to all technically possible combinations:
- the calculating module is configured to calculate a single setpoint for limiting the movement for the plurality of vehicles;
- the transmission module is configured to transmit, to the plurality of vehicles associated with the detected event, a single command message for commanding a limitation of the movement of the vehicle, said command message including the calculated setpoint;
- the setpoint limiting the movement includes a limitation of the speed of the vehicle and/or a limitation of the variation of the speed of the vehicle;
- the event detected by the detecting module is chosen from among the group consisting of: a weather event, a high density of traffic elements and an attack against the plurality of vehicles;
- the calculating module is configured to calculate each setpoint for limiting the movement via a selection, as a function of an intensity of the detected event, of a level from among several setpoint levels,
a maximum setpoint level preferably corresponding to a stop of the vehicle;
- the setpoint values associated with the setpoint levels depend on a type of the detected event,
the type of the detected event preferably being chosen from among the group consisting of:
  - a type of weather event, such as fog, ice, snow, rain, wind;
  - an abnormal density of traffic elements; and
  - a type of attack, such as a cyberattack, a terrorist attack.

The invention also relates to a transport system comprising a set of autonomous motor vehicles and an electronic monitoring device configured to monitor said set of autonomous motor vehicles, the electronic monitoring device being as defined above.

According to other advantageous aspects of the invention, the transport system comprises one or more of the following features, considered alone or according to all technically possible combinations:

each autonomous motor vehicle has a level of automation greater than or equal to 3 on the scale of the Organisation Internationale des Constructeurs Automobiles; and each autonomous motor vehicle comprises a receiving module configured to receive a setpoint for limiting the movement of the electronic monitoring device and a module for controlling a trajectory of the vehicle, the control module being configured to command a limitation of the movement of the vehicle as a function of the received limiting setpoint.

The invention also relates to a method for monitoring a set of autonomous motor vehicles, the method being carried out by an electronic monitoring device and comprising:

detecting an event associated with a plurality of vehicles from among the set of autonomous motor vehicles;

calculating, as a function of the detected event, a setpoint for limiting the movement for each vehicle of said plurality of vehicles;

transmitting the calculated setpoint(s) to the plurality of vehicles associated with the detected event.

The invention also relates to a non-transitory computer-readable medium including a computer program including software instructions which, when executed by a computer, implement a monitoring method as defined above.

BRIEF DESCRIPTION OF THE DRAWINGS

These features and advantages of the invention will appear more clearly upon reading the following description, provided solely as a non-limiting example, and done in reference to the appended drawings, in which.

DETAILED DESCRIPTION

In the rest of the description, the expression "substantially equal to" designates a relationship of equality to within plus or minus 10%, preferably to within plus or minus 5%.

Figure 1:
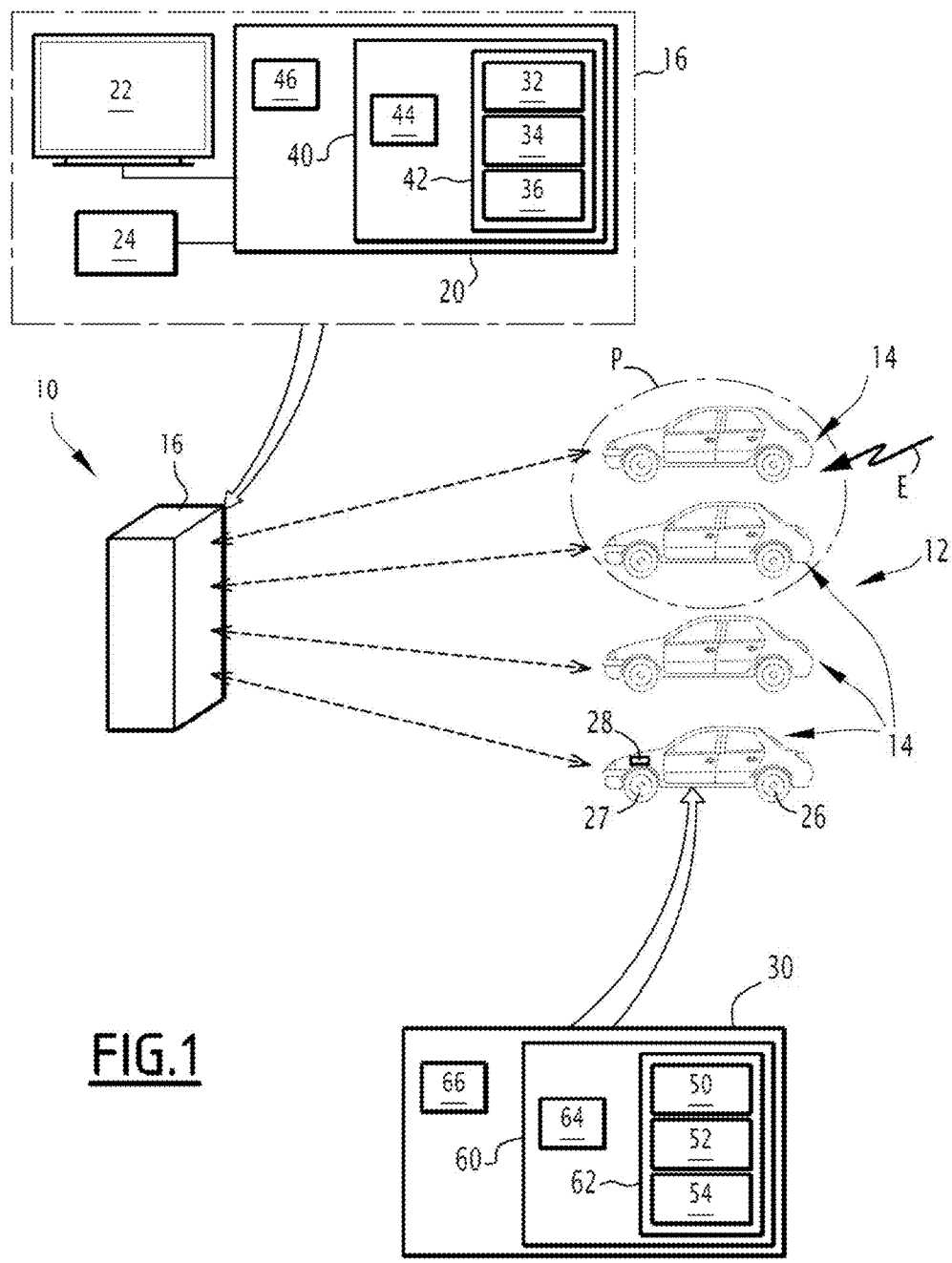
FIG. 1 is a schematic illustration of a transport system according to the invention, comprising a set of autonomous motor vehicles and an electronic monitoring device configured to monitor said set.

In FIG. 1, a transport system 10 comprises a set 12 of several autonomous motor vehicles 14 and an external platform 16 for supervising the set 12 of autonomous motor vehicles 14. The external supervision platform 16 comprises an electronic device 20 for monitoring said set of autonomous motor vehicles 14. In addition, the external supervision platform 16 comprises a display monitor 22 and input/output means 24, such as a keyboard and a mouse, each being connected to the electronic monitoring device 20.

Each motor vehicle 14 comprises, in a known manner, rear wheels 26, front wheels 27, a motor 28 mechanically connected via a transmission chain (not shown) to the rear 26 and/or front 27 wheels for the driving of said wheels 26 and/or 27 in rotation around their axis, a steering system (not shown), suitable for acting on the wheels 26 and/or 27 of the vehicle 14 so as to modify the orientation of its trajectory, and a braking system (not shown), suitable for exerting a braking force on the wheels 26, 27 of the vehicle 14.

Each motor vehicle 14 is typically made up of a traction and/or electric propulsion vehicle. To that end, the motor 28 is made up of an electric motor, and the vehicle 14 comprises an electric battery (not shown) electrically connected to the motor 28 to supply the motor 28 with electricity.

Each motor vehicle 14 is an autonomous vehicle. To that end, the motor vehicle 14 comprises an electronic autonomous driving device 30 suitable for controlling the vehicle autonomously by receiving information on the environment of the vehicle 14 by means of sensors (not shown) and by acting on the motor 28, the steering system and the braking system, so as to modify the speed, the acceleration and the trajectory of the vehicle 14 in response to the received information.

Each autonomous motor vehicle 14 preferably has a level of automation greater than or equal to 3 on the scale of the Organisation Internationale des Constructeurs Automobiles (OICA). The level of automation is then equal to 3, i.e., a conditional automation, or equal to 4, i.e., a high automation, or equal to 5, i.e., a full automation.

According to the OICA scale, level 3 for conditional automation corresponds to a level for which the driver does not need to perform continuous monitoring of the driving environment, while still having to be able to take back control of the autonomous motor vehicle 14. According to this level 3, a system for managing the autonomous driving, on board the autonomous motor vehicle 14, then performs the longitudinal and lateral driving in a defined usage case and is capable of recognizing its performance limits to then ask the driver to take back dynamic driving with a sufficient time margin.

The high level of automation 4 then corresponds to a level for which the driver is not required in a defined usage case. According to this level 4, the system for managing the autonomous driving, on board the autonomous motor vehicle 14, then performs the dynamic longitudinal and lateral driving in all situations in this defined usage case.

The full automation level 5 lastly corresponds to a level for which the system for managing the autonomous driving, on board the autonomous motor vehicle 14, performs the dynamic lateral and longitudinal driving in all situations encountered by the autonomous motor vehicle 14, throughout its entire journey. No driver is then required.

The electronic monitoring device 20 comprises a module 32 for detecting an event E associated with a plurality P of vehicles 14 from among the set 12 of autonomous motor vehicles 14.

The electronic monitoring device 20 also comprises a module 34 for calculating, as a function of the detected event E, a setpoint, i.e. an instruction, for limiting the movement for each vehicle 14 of said plurality P of vehicles and a module 36 for transmitting the calculated setpoint(s) to the plurality P of vehicles 14 associated with the detected event E.

One skilled in the art will understand that the plurality P of vehicles 14 corresponds to all or part of the set 12 of autonomous motor vehicles 14.

In the example of FIG. 1, the electronic monitoring device 20 comprises a first information processing unit 40 for example made up of a first memory 42 and a first processor 44 associated with the first memory 42. The electronic monitoring device 20 comprises a first transceiver 46, in particular configured to exchange, in the form of radio waves, data with one or several corresponding autonomous motor vehicles 14, in particular those of the plurality P.

The electronic autonomous driving device 30 comprises a receiving module 50 configured to receive a setpoint for limiting the movement of the electronic monitoring device 20, and a module 52 for controlling a trajectory of the vehicle, the control module 52 being configured to command a limitation of the movement of the vehicle 14 as a function of the received limiting setpoint.

The electronic autonomous driving device 30 comprises a geolocation module 54 for determining the position of the motor vehicle 14, as well as, in addition, the speed and the acceleration of the vehicle 14.

"Position", whether the latter in particular refers to a vehicle 14 or a detected event E, refers to the geographical position of the element, such as the vehicle 14 or the detected event E, i.e., the coordinates of the element in a predefined coordinate system, such as the terrestrial coordinate system.

In the example of FIG. 1, the electronic autonomous driving device 30 comprises a second information processing unit 60 for example made up of a second memory 62 and a second processor 64 associated with the second memory 62. The electronic autonomous driving device 30 comprises a second transceiver 66, in particular configured to exchange, in the form of radio waves, data with the electronic monitoring device 20, in particular with its first transceiver 46.

In the example of FIG. 1, the detection module 32, the calculating module 34 and the transmission module 36 are each made in the form of software, or a software module, executable by the first processor 44. The first memory 42 of the electronic monitoring device 20 is then able to store detection software configured to detect the event E associated with the plurality P of vehicles 14 from among the set 12 of autonomous motor vehicles 14, calculating software configured to calculate, as a function of the detected event E, a setpoint limiting the movement for each vehicle 14 of said plurality P of vehicles and transmission software configured to transmit the calculating setpoint(s) to the plurality P of vehicles associated with the detected event E. The first processor 44 is then able to execute each software application from among the detection software, the calculating software and the transmission software.

In an alternative that is not shown, the detection module 32, the calculating module 34 and the transmission module 36 are each made in the form of a programmable logic component, such as an FPGA (Field Programmable Gate Array), or in the form of a dedicated integrated circuit, such as an ASIC (Applications Specific Integrated Circuit).

When the electronic monitoring device 20 is made in the form of one or several software programs, i.e., in the form of a computer program, it is further able to be stored on a medium, not shown, readable by computer. The computer-readable medium is for example a medium suitable for storing electronic instructions and able to be coupled with a bus of a computer system. As an example, the readable medium is an optical disc, a magnetic-optical disc, a ROM memory, a RAM memory, any type of non-volatile memory (for example, EPROM, EEPROM, FLASH, NVRAM), a magnetic card or an optical card. A computer program including software instructions is then stored on the readable medium.

The detection module 32 is configured to detect the event E associated with the plurality P of vehicles 14, this event E affecting the plurality P of vehicles 14 all at once. The event E able to be detected by the detecting module 32 is for example chosen from among the group consisting of: a weather event, a high density of traffic elements and an attack against the plurality P of vehicles 14.

The detection module 32 is for example connected to a weather station, not shown, and is configured to receive, from the weather station, a list of weather events, updated regularly, then to filter said list in order to keep only the weather events affecting a geographical zone where the autonomous motor vehicles 14 of the set 12 are located. The detection module 32 is further configured to retain, from among the weather events affecting said geographical zone, only those having an intensity above a predefined intensity threshold. The detection module 32 is then for example configured to associate each selected weather event with one or several autonomous motor vehicles 14, as a function, on the one hand, of the position of the selected weather event, and on the other hand, of the position of each autonomous motor vehicle 14. Each detected weather event is then a selected weather event associated with a given plurality P of autonomous motor vehicles 14.

Each weather event is for example of the type chosen from among the group consisting of: fog, ice, snow, rain and wind. The predefined intensity threshold then preferably depends on the type of weather event.

Additionally or as a variant, the detection module 32 is for example connected to a video surveillance system for public spaces, not shown, and is configured to receive, from the video surveillance system, a series of images of the public spaces, taken regularly, then to filter said series of images in order to keep only the images regarding a geographical zone where the autonomous motor vehicles 14 of the set 12 are located. The detection module 32 is further configured to retain, from among the images regarding said geographical zone, only those having a density of traffic elements above a predefined density threshold. The detection module 32 is then for example configured to associate each selected image with one or several autonomous motor vehicles 14, as a function, on the one hand, of the position of the public space associated with the selected image, and on the other hand, of the position of each autonomous motor vehicle 14. Each detected high density of traffic elements then corresponds to a selected image associated with a given plurality P of autonomous motor vehicles 14.

Each traffic element is an element able to travel and/or pass through a traffic path. The traffic path is a path allowing the circulation of a traffic element, in particular of a motor vehicle, such as an autonomous motor vehicle 14.

Each traffic element is in particular an element able to be located in a detection zone corresponding to a field of view of the video surveillance system.

Each traffic element is for example chosen from among the group consisting of: a motorized vehicle, a non-motorized vehicle, a pedestrian and an animal.

Additionally or as a variant, the detection module 32 is for example connected to each of the autonomous motor vehicles 14 of the set 12, and is configured to receive, from each autonomous motor vehicle 14, one or several status messages from said vehicle. The detection module 32 is further configured to select, from the received status messages, only those indicating a serious anomaly, i.e., having a severity above a predefined severity threshold. A serious anomaly is typically an anomaly whereof the occurrence causes a risk relative to the safety of the autonomous motor vehicle 14. A serious anomaly is for example an anomaly affecting the steering system and/or the braking system of the autonomous motor vehicle 14. The detection module 32 is then for example configured to associate each serious anomaly with one or several autonomous motor vehicles 14 as a function of the position of the autonomous motor vehicle(s) 14 having sent the status message(s) corresponding to this anomaly. Each serious anomaly is considered as potentially revealing an attack, in particular if it relates to several autonomous motor vehicles 14 at once. Each detected attack then corresponds to a serious anomaly associated with a given plurality P of autonomous motor vehicles 14.

The calculating module 34 is configured to calculate, as a function of the detected event E, a setpoint for limiting the movement for each vehicle of said plurality P of vehicles 14.

As an optional addition, the calculating module 34 is configured to calculate a single setpoint for limiting the movement for the plurality P of vehicles 14.

The setpoint limiting the movement preferably includes a limitation of the speed of the vehicle 14 and/or a limitation of the speed variation of the vehicle 14. The speed variation limitation of the vehicle is an acceleration or deceleration limitation of the vehicle 14.

Speed variation refers to a variation of the speed of the vehicle as a function of time, i.e., a drift of the speed relative to time. By convention, a positive speed variation is then an acceleration of the vehicle 14, and a negative speed variation is then a deceleration of the vehicle 14.

As an optional addition, the calculating module 34 is configured to calculate each setpoint for limiting the movement via a selection, as a function of an intensity of the detected event E, of a level from among several setpoint levels N1, N2, N3, N4. One skilled in the art will typically understand that the higher the intensity of the detected event E is, the higher the selected setpoint level will be, i.e., the greater the associated limitation will be, i.e., the lower the speed and/or speed variation of the vehicle 14 will be in absolute value.

As an example, when the type of detected event E is fog, the denser the fog is, the lower the speed and/or speed variation of the vehicle 14 in absolute value resulting from the calculated setpoint will be. Likewise, when the type of detected event E is snow or rain, the figure the snow or rain is, the lower the speed and/or speed variation of the vehicle 14 in absolute value resulting from the calculated setpoint will be. Additionally, when the type of detected event E is wind, the stronger the wind is, i.e., the higher the wind speed is, the lower the speed and/or speed variation of the vehicle 14 in absolute value resulting from the calculated setpoint will be. When the type of detected event E is an abnormal density of traffic elements, the higher the density is, the lower the speed and/or speed variation of the vehicle 14 in absolute value resulting from the calculated setpoint will be.

The setpoint levels N1, N2, N3, N4 are for example predefined.

Aside from an initial level N0 corresponding to a nominal operating setpoint of the vehicle 14, several setpoint levels N1, N2, N3, N4 are provided, for example first N1, second N2, third N3 and fourth N4 setpoint levels, classified by increasing order.

A maximum setpoint level, such as the fourth setpoint level N4, preferably corresponds to a stop of the vehicle 14, the calculated setpoint then being a stop setpoint of the vehicle.

The first setpoint level N1 for example corresponds to a limitation of the speed of the vehicle 14 to a speed below or equal to a first speed threshold and/or to a limitation of the speed variation of the vehicle 14 to a speed variation less than or equal in absolute value to a first speed variation threshold. The second setpoint level N2 for example corresponds to a limitation of the speed of the vehicle 14 to a speed below or equal to a second speed threshold, strictly less than the first speed threshold and/or to a limitation of the speed variation of the vehicle 14 to a speed variation less than or equal in absolute value to a second speed variation threshold, strictly less than the first speed variation threshold. As a similar example, the third setpoint level N3 corresponds to a limitation of the speed of the vehicle 14 to a speed below or equal to a third speed threshold, strictly less than the second speed threshold and/or to a limitation of the speed variation of the vehicle 14 to a speed variation less than or equal in absolute value to a third speed variation threshold, strictly less than the second speed variation threshold. One skilled in the art will of course understand that each speed variation threshold, in particular each of the first, second and third speed variation thresholds, is positive, or nil in the event the speed variation limited in absolute value to this nil threshold is in turn nil.

As an optional addition, the setpoint values associated with the setpoint levels N1, N2, N3, N4 depend on a type of the detected event E. The type of detected event E is preferably chosen from the among the group consisting of: a type of weather event, such as fog, ice, snow, rain, wind; an abnormal density of traffic events; and a type of attack, such as a cyberattack, a terrorist attack. In other words, in the example of the first N1, second N2, third N3 and fourth N4 setpoint levels, previously described, the values of the first, second and third speed threshold, and/or the values of the first, second and third speed variation threshold depend on the type of the detected event E.

As an example of this optional addition, when the type of the detected event E is fog, the initial level N0 corresponds to a speed of the vehicle 14 substantially equal to 50 km/h, the first speed threshold is substantially equal to 37.5 km/h, the second speed threshold is substantially equal to 25 km/h and the third speed threshold is substantially equal to 12.5 km/h, the maximum level N4 corresponding to a stop of the vehicle 14, i.e., to a nil speed. When the type of the detected event E as an abnormal level of traffic elements, the initial level N0 corresponds to a speed of the vehicle 14 substantially equal to 20 km/h, the first speed threshold is substantially equal to 7.5 km/h, the second speed threshold is substantially equal to 5 km/h and the third speed threshold is substantially equal to 2.5 km/h, the maximum level N4 corresponding to a stop of the vehicle 14, i.e., to a nil speed.

As another optional addition, the type of the limiting setpoint of the movement depends on the type of the detected event E, the type of the limiting setpoint being chosen from among the limitation of the speed of the vehicle 14, a limitation of the speed variation of the vehicle 14 and a combined limitation of the speed and the speed variation of the vehicle 14.

As an example of this optional addition, when the type of the detected event E is fog or wind, the type of limiting setpoint is a limitation of the speed of the vehicle 14. When the type of detected event E is ice, snow or rain, the type of limiting setpoint is a combined limitation of the speed and speed variation of the vehicle 14.

The setpoint levels other than the maximum setpoint level, such as the first N1, second N2 and third N3 setpoint levels, are for example scaled linearly between the initial level N0 (corresponding to a nominal operating setpoint of the vehicle 14) and the maximum setpoint level, such that the fourth setpoint level N4, corresponds to a stop of the vehicle 14.

As an example, if the initial level N0 corresponds to a speed of the vehicle 14 equal to 50 km/h and the maximum level N4 corresponds to a stop of the vehicle 14, i.e., to a nil speed, then the first speed threshold is substantially equal to 37.5 km/h, the second speed threshold is substantially equal to 25 km/h and the third speed threshold is substantially equal to 12.5 km/h.

The transmission module 36 is configured to transmit the calculated setpoint(s) to the plurality P of vehicles 14 associated with the detected event E. The transmission module 36 is for example configured to transmit, to each vehicle 14 of the plurality of vehicles 14 associated with the detected event E, a message commanding a limitation of the movement of the vehicle, said command message including the setpoint calculated for said vehicle 14.

As an optional addition, the transmission module 36 is configured to transmit, to the plurality P of vehicles 14 associated with the detected event E, a single message commanding a limitation of the movement of the vehicle, said command message including the calculated unique limiting setpoint.

In the example of FIG. 1, the receiving module 50, the control module 52 and the geolocation module 54 are each made in the form of software, or a software module, executable by the second processor 64. The second memory 62 of the electronic autonomous driving device 30 is then able to store a receiving module configured to receive the setpoint for limiting the movement of the electronic monitoring device 20, control software configured in particular to command a limitation of the movement of the vehicle 14 as a function of the received limiting setpoint, and geolocation software configured to determine the position of the motor vehicle 14. The second processor 64 is then able to execute each of the software applications from among the receiving software, the control software and the geolocation software.

In a variant that is not shown, the receiving module 50, the control module 52 and the geolocation module 54 are each made in the form of a programmable logic component, such as an FPGA (Field Programmable Gate Array), or in the form of a dedicated integrated circuit, such as an ASIC (Applications Specific Integrated Circuit).

When the electronic autonomous driving device 30 is made in the form of one or several software programs, i.e., in the form of a computer program, it is further able to be stored on a medium, not shown, readable by computer. The computer-readable medium is for example a medium suitable for storing electronic instructions and able to be coupled with a bus of a computer system. As an example, the readable medium is an optical disc, a magnetic-optical disc, a ROM memory, a RAM memory, any type of non-volatile memory (for example, EPROM, EEPROM, FLASH, NVRAM), a magnetic card or an optical card. A computer program including software instructions is then stored on the readable medium.

Figure 2:
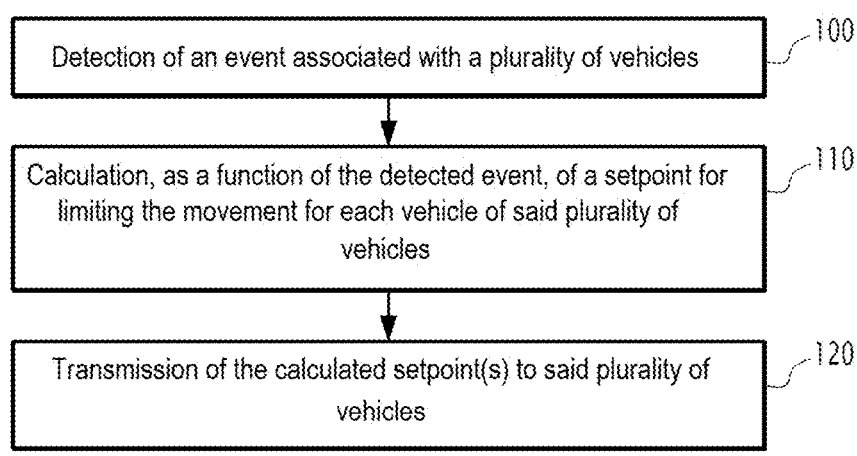
FIG. 2 is a flowchart of a method, according to the invention, for monitoring the set of autonomous motor vehicles of FIG. 1.

The operation of the electronic monitoring device 20 according to the invention will now be explained using FIG. 2 showing an organizational chart of the method, according to the invention, for monitoring the set 12 of autonomous motor vehicles 14, the method being carried out by the electronic monitoring device 20.

During an initial step 100, the monitoring device 20 detects, via its detection module 32, the event E associated with the plurality P of vehicles 14 from among the set 12 of autonomous motor vehicles 14.

As previously indicated, this detection of any event(s) E is for example done using a weather station and/or a video surveillance system connected to the detection module 32.

During this detection step 100, the surveillance device 20 for example detects a weather event, such as fog, ice, snow, rain, or wind; an abnormal density of traffic elements; or an attack, such as a cyberattack or a terrorist attack, against the autonomous motor vehicles.

The monitoring device 20 calculates, during the following step 110 and via its calculating module 34, the setpoint for limiting the movement for each vehicle of said plurality P of vehicles 14, as a function of the detected event E, as previously explained.

The monitoring device 20 lastly transmits, during the following step 120 and via its transmission module 36, the calculated setpoint(s) to the plurality P of vehicles 14 associated with the detected event E.

During this transmission step 120, the transmission module 36 for example transmits, to each vehicle 14 of said plurality P, a message commanding a limitation of the movement of the vehicle, said command message including the setpoint calculated for the respective vehicle 14.

As an optional addition, during this step 120, the transmission module 36 transmits, to said plurality P of vehicles 14, a single message commanding a limitation of the movement of the vehicle, said command message including a calculated unique limiting setpoint for said plurality P of vehicles 14.

Thus, the electronic monitoring device 20 according to the invention makes it possible to detect an event E capable of affecting the safety of the plurality P of vehicles 14, then calculating, as a function of the detected event E, a setpoint limiting the movement for each vehicle 14 of said plurality P, and next transmitting the calculated setpoints to said plurality P of vehicles 14, so that each vehicle 14 of said plurality P limits its movement as a function of the received setpoint.

The electronic monitoring device 20 according to the invention then makes it possible to command a limitation of the movement of each vehicle 14 for the plurality P of vehicles at one time, from the detection of the event E shared by this plurality P.

One skilled in the art will in particular observe that the electronic monitoring device 20 according to the invention makes it possible to command the stop of the plurality P of vehicles 14 at one time, when the calculated limiting setpoint corresponds to a stop of the vehicle, in particular when the calculated limiting setpoint corresponds to a maximum setpoint level and the latter corresponds to a stop of the vehicle. This command to stop the plurality P of vehicles 14 is particularly suitable when the detected event E has a particular criticality.

Nevertheless, in certain cases, for example when the detected event E is a terrorist attack, or even a cyberattack, it is preferable not to command a stop of the plurality P of vehicles 14, in order to reduce the risk of physical attack against passengers of said plurality P of vehicles 14. In this or these case(s), the calculated limiting setpoint corresponds to an intermediate setpoint level, separate from a stop of the vehicle.

One skilled in the art will understand that the electronic monitoring device 20 is still more advantageous when the event E is not detectable using sensors on board each respective autonomous vehicle 14, or when the event E is detectable only by some vehicles 14 of said plurality P.

One can thus see that the electronic monitoring device 20 according to the invention, and the associated monitoring method, make it possible to further improve the safety of the passengers on board such autonomous motor vehicles 14.

The invention claimed is:

1. An electronic device for monitoring a set of autonomous motor vehicles, the device comprising:

a detection module configured to detect an event associated with a plurality of vehicles from among the set of autonomous motor vehicles;

a calculating module configured to calculate, as a function of the detected event, a setpoint for limiting the movement for each vehicle of said plurality of vehicles; and a transmission module configured to transmit the calculated setpoint(s) to the plurality of vehicles associated with the detected event, wherein the transmission module is configured to transmit, to the plurality of vehicles associated with the detected event, a command message for commanding a limitation of the movement of the vehicle, said command message including the calculated setpoint, and wherein the calculating module is configured to calculate each setpoint for limiting the movement via a selection, as a function of an intensity of the detected event, of a level from among several setpoint levels.

2. The device according to claim 1, wherein the calculating module is configured to calculate a single setpoint for limiting the movement for the plurality of vehicles.

3. The device according to claim 2, wherein the transmission module is configured to transmit, to the plurality of vehicles associated with the detected event, a single command message for commanding a limitation of the movement of the vehicle, said command message including the calculated setpoint, wherein the command message is a single message for the plurality of vehicles associated with the detected event.

4. The device according to claim 1, wherein the setpoint limiting the movement includes a limitation of the speed of the vehicle and/or a limitation of the variation of the speed of the vehicle.

5. The device according to claim 1, wherein the event detected by the detecting module is chosen from among the group consisting of: a weather event, a high density of traffic elements and an attack against the plurality of vehicles.

6. The device according to claim 5, wherein a maximum setpoint level corresponds to a stop of the vehicle.

7. The device according to claim 5, wherein the setpoint values associated with the setpoint levels depend on a type of the detected event.

8. The device according to claim 7, wherein the type of the detected event is chosen from among the group consisting of: a type of weather event; an abnormal density of traffic elements; and a type of attack.

9. The device according to claim 8, wherein the type of weather event is chosen from among the group consisting of: fog; ice; snow; rain; and wind.

10. The device according to claim 8, wherein the type of attack is chosen from among the group consisting of: a cyberattack; and a terrorist attack.

11. A transport system comprising a set of autonomous motor vehicles and an electronic monitoring device configured to monitor said set of autonomous motor vehicles, the electronic monitoring device being according to claim 1.

12. A method for monitoring a set of autonomous motor vehicles, the method being carried out by an electronic monitoring device and comprising:

detecting an event associated with a plurality of vehicles from among the set of autonomous motor vehicles;

calculating, as a function of an intensity of the detected event, of a level from among several setpoint levels, a setpoint for limiting the movement via a selection for each vehicle of said plurality of vehicles; and transmitting a command message for commanding a limitation of the movement of the vehicle, said command message including the calculated setpoint(s) to the plurality of vehicles associated with the detected event.

13. A non-transitory computer-readable medium including a computer program comprising software instructions which, when executed by a computer, carry out a method according to claim 12.

* * * * *